United States Patent [19]
Phung

[11] Patent Number: 6,046,272
[45] Date of Patent: Apr. 4, 2000

[54] NON YELLOWING, THERMALLY STABLE POLYVINYL ALCOHOL

[75] Inventor: Kien Van Phung, Allentown, Pa.

[73] Assignee: Air Products and Chemicals, Inc., Allentown, Pa.

[21] Appl. No.: 09/015,560

[22] Filed: Jan. 29, 1998

[51] Int. Cl.[7] .......................... C08F 16/06; C08F 116/06; C08F 216/06; C08G 63/48; C08G 63/91
[52] U.S. Cl. .................. 525/56; 525/61; 525/62
[58] Field of Search .................... 525/56, 61, 62

[56] References Cited

U.S. PATENT DOCUMENTS

| | | |
|---|---|---|
| 2,734,048 | 2/1956 | Bristol et al. . |
| 2,850,489 | 9/1958 | Turnbull . |
| 2,862,916 | 12/1958 | Lukman et al. . |
| 3,156,667 | 11/1964 | Martins . |
| 3,198,651 | 8/1965 | Shiraishi . |
| 3,220,991 | 11/1965 | Martins . |
| 3,262,905 | 7/1966 | Martins . |
| 3,513,142 | 5/1970 | Blumberg et al. . |
| 3,679,646 | 7/1972 | Bristol . |
| 3,679,647 | 7/1972 | Bristol . |
| 3,697,495 | 10/1972 | Bristol . |
| 4,772,663 | 9/1988 | Marten et al. ............... 525/60 |

FOREIGN PATENT DOCUMENTS

| | | |
|---|---|---|
| 3825104 | of 1988 | Germany . |
| 48-038792 | of 1973 | Japan . |
| 52026589 | of 1975 | Japan . |
| 211091 | of 1966 | U.S.S.R. . |

OTHER PUBLICATIONS

*The Measurement of Appearance*. 2d ed. edited by Richard S. Hunter and Richard W. Harold. Wiley, (1987) pp. 211 & 214.

*Primary Examiner*—Nathan M. Nutter
*Attorney, Agent, or Firm*—Mary E. Bongiorno

[57] ABSTRACT

A process for making a thermally stable and substantially low yellow polyvinyl alcohol, and a process for reversing discoloration of polyvinyl alcohol. The process consists of treating polyvinyl acetate before saponification or treating polyvinyl alcohol after saponification with a small amount of a reducing phosphorus-containing compound and, optionally, a trace amount of a peroxide. This invention is particularly useful in producing low molecular weight polyvinyl alcohol which is thermally stable and low in yellow color.

20 Claims, No Drawings

NON YELLOWING, THERMALLY STABLE POLYVINYL ALCOHOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Polyvinyl alcohol is typically prepared by alkaline alcoholysis, also known as saponification, of polyvinyl acetate. Yellow coloration of the polyvinyl alcohol is a problem associated with its production and has been attributed to molecular weight, the number of aldehyde groups in the polyvinyl alcohol, and to ash content in the polyvinyl alcohol. It is believed that, since the mechanism of termination in polymerization of vinyl acetate is exclusively by disproportionation, aldehyde end-groups are generated upon hydrolysis. Aldol-condensation of the terminal aldehyde of polyvinyl alcohol with monomeric and oligomeric aldehydes and dehydration by thermal drying lead in general to discoloration due to formation of conjugated double bonds with terminal aldehyde groups. The discoloration becomes more intense the lower the molecular weight of the polyvinyl alcohol and is permanent after the polyvinyl alcohol is dried. Discoloration has also been attributed to degradation of the polyvinyl alcohol when it is subject to high temperatures; for example, temperatures of 100° C. or more.

The presence of yellow color in the polyvinyl alcohol can be troublesome in many applications. For example, when polyvinyl alcohol is used as a coating in papermaking processes or as a sizing agent. It is therefore desirable to produce polyvinyl alcohols that are as low in yellow color as possible. It is also desirable to produce polyvinyl alcohols which are thermally stable; i.e., do not become more discolored with the application of heat.

Various methods have been used in attempts to achieve colorless or very low yellow color polyvinyl alcohol and some of them are described below.

USSR 211,091 (1966) (Derwent Abstract, AN 68-38552Q) discloses the use ortho-phosphoric acid to neutralize the alkali after saponification of vinyl acetate copolymers to produce a white powder product.

U.S. Pat. No. 3,156,667 (Martins, 1964) discloses the use of phosphoric acid to neutralize the polyvinyl acetate hydrolyzates after the conversion to polyvinyl alcohol. The amount of phosphoric acid used is chemically equivalent to 100 to 200% of the alkaline base. This method was reported to produce polyvinyl alcohol with negligible color.

U.S. Pat. No. 3,262,905 (Martins, 1966) discloses treatment of polyvinyl alcohol with alkali metal phosphate to prevent coloration of the polyvinyl alcohol.

U.S. Pat. No. 3,697,495 (Bristol, 1972) discloses treatment of polyvinyl acetate with ozone prior to alcoholysis to produce a polyvinyl alcohol with improved color properties.

JP 48038792 (1973) (Derwent Abstract AN 73-62319U) discloses the addition of hydrogen peroxide or organic peroxide to the reaction system when conversion of vinyl acetate reaches 60% and before saponification is effected to give a white polyvinyl alcohol.

U.S. Pat. No. 4,772,663 (Marten et al, 1988) discloses the production of vinyl alcohol copolymers in which a small amount of an acid, such as phosphorous acid, oxalic acid and citric acid, is added to the vinyl acetate stream prior to the first polymerization vessel, as a means of reducing the color of the product.

BRIEF SUMMARY OF THE INVENTION

This invention is directed to a process for making a thermally stable substantially low yellow color polyvinyl alcohol. It is also directed to a method of reversing discoloration in polyvinyl alcohol. In this process, polyvinyl acetate is treated before saponification or polyvinyl alcohol is treated after saponification with 0.5 to 10% by weight of a reducing phosphorus-containing compound and 0 to 5% by weight of a peroxide, based on the weight of polyvinyl acetate or polyvinyl alcohol. The mixture of polyvinyl acetate, reducing phosphorus-containing compound, and peroxide is heated to 40 to 70° C. for 0.5 to 3 hours before transferring the polyvinyl acetate to a saponification process. The mixture of polyvinyl alcohol, reducing phosphorus-containing compound, and peroxide is allowed to stand for 0.5 to 3 hours. The polyvinyl alcohol that is derived from the treated polyvinyl acetate or the separately treated polyvinyl alcohol is substantially low in yellow color and thermally stable as shown by little or no increase in yellow color at elevated temperatures. This invention is particularly useful for reducing or reversing discoloration of low molecular weight polyvinyl alcohol.

BRIEF DESCRIPTION OF THE SEVERAL VIEWS OF THE DRAWINGS

Not applicable.

DETAILED DESCRIPTION OF THE INVENTION

Discoloration or yellowing of polyvinyl alcohol can occur during or after its production. Polyvinyl alcohol is derived from polyvinyl acetate which is made by well known methods. Solution polymerization of vinyl acetate is generally used, since the resulting polymer can then be directly hydrolyzed to produce polyvinyl alcohol. In general, polyvinyl acetate is prepared by feeding vinyl acetate monomer into a reactor along with a free radical initiator and continuously purging the reactor with nitrogen. Methanol is added as a solvent and as a chain transfer agent to control molecular weight.

The degree of polymerization (Dp) of the polyvinyl acetate can range from about 100 to 2500. The desired degree of polymerization will vary depending on its subsequent use. For example, a Dp of 150 to 500 is preferred for paper coating applications.

Since the polymerization reaction cannot be taken to completion, residual vinyl acetate is removed via a stripping column, before the polyvinyl acetate is transferred to a saponification process in which polyvinyl alcohol is made. Industrially, the typical method of forming polyvinyl alcohol from polyvinyl acetate is by transesterification in which an alcohol, typically methanol, is reacted with the polyvinyl acetate in the presence of an alkaline catalyst. This process is frequently referred to as saponification.

To obtain a thermally stable and substantially low yellow color polyvinyl alcohol, a small amount of a reducing phosphorus-containing compound, optionally, with a trace amount of a peroxide, is mixed with the polyvinyl acetate or the polyvinyl alcohol, in the form of an alcohol solution, preferably a methanol solution, before or immediately after saponification of the polyvinyl acetate.

Examples of appropriate reducing phosphorus-containing compounds are phosphorous acid, hypophosphorous acid, and sodium and ammonium salts of phosphorous or hypophosphorous acid. Hypophosphorous acid is preferred.

Examples of appropriate peroxides include hydrogen peroxide, tert-butylhydroperoxide, and cumyl hydroperoxide. Hydrogen peroxide is preferred.

The following method can be used in treating polyvinyl acetate prior to saponification. An alcoholic solution of about 20 to 60 wt %, preferably 30 to 50 wt %, of a reducing phosphorus-containing compound, based on the combined weight of polyvinyl acetate and solvent, is added to the polyvinyl acetate solution. The reducing phosphorus-containing compound solution is added to the polyvinyl acetate with mixing and the mixture is heated to about 40 to 70° C., preferably 50 to 60° C., for 0.5 to 3 hours, preferably 1–2 hours. The mixture is then fed to a saponification unit for production of polyvinyl alcohol. The polyvinyl alcohol, formed from the treated polyvinyl acetate, is substantially low in yellow color and is thermally stable at temperatures up to 150° C.

To reduce the yellow color of polyvinyl alcohol, after saponification, the polyvinyl alcohol gel can be washed with methanol and then filtered before it is treated with the reducing phosphorus-containing compound. However, washing the gel prior to treatment is not required. The reducing phosphorus-containing compound solution is added to the gel with stirring to produce a slurry. The slurry can be heated to 40 to 70° C., in order to obtain a more homogeneous slurry; but heating is not required. The slurry is allowed to stand for about 0.5 to 3 hours; preferably 1–2 hours. The polyvinyl alcohol is then filtered and dried and is thermally stable, as indicated by little or no change in color, at temperatures up to 150° C.

The amount of reducing phosphorus-containing compound is about 0.5 to 10 wt %, preferably 1 to 3 wt %, and the amount of peroxide is 0 to 5 wt %, preferably 0.3 to 1 wt %, based on the weight of polyvinyl alcohol or polyvinyl acetate. The reducing phosphorus-containing compound and peroxide are preferably in the form of an alcohol solution; most preferably methanol.

Reversal of yellow color formation in polyvinyl alcohol can be achieved by the following method. The discolored polyvinyl alcohol powder or granulate is mixed, under stirring, with an amount of alcohol, preferably methanol, containing the reducing phosphorus-containing acid or salt and, optionally, a peroxide, producing swollen particles or a slurry of the polyvinyl alcohol particles. The amounts of phosphorus-containing compound and peroxide are the same as described above for treatment of polyvinyl acetate before saponification or of polyvinyl alcohol after saponification. The slurry or swollen particles can be heated to 40 to 70° C., to make a more homogeneous slurry; but heating is not required. A reversal of color is typically observable in the swollen polyvinyl alcohol after about 1 to 2 hours. The substantially low color polyvinyl alcohol produced can then be dried at temperatures up to about 150° C., without substantial color change.

APHA (American Public Health Association) color is typically used to characterize polymers with respect to the yellowness of the polymers. APHA color or APHA number refers to a platinum-cobalt standard. Colorimeters can be calibrated according to the standard platinum cobalt solutions and polymeric solutions can be compared to the standards to determine the APHA number. The higher the APHA number, the more yellow the polymeric solution.

(Reference: *The Measurement of Appearance*, 2d ed., by Richard S. Hunter and Richard W. Harold, Wiley, 1987, p. 211 and 214.)

By substantially low yellow color is meant an APHA number, using deionized (DI) water as the control, of less than 60, preferably less than 30, for a 4% aqueous solution of polyvinyl alcohol having a degree of polymerization between 120 to 250; and an APHA number of less than 30, preferably less than 10, for a 4% aqueous solution of polyvinyl alcohol with a degree of polymerization between 250 and 350.

The substantially low yellow color of the polyvinyl alcohol achieved by treatment with a reducing phosphorus-containing compound can be maintained even after prolonged exposure to high temperatures; e.g., temperatures above about 100° C. for more than 1 hour; especially at temperatures up to about 150° C. for more than an hour.

The invention will be further clarified by a consideration of the following examples, which are intended to be purely exemplary of the invention.

EXAMPLE 1

Synthesis of Low Molecular Weight Polyvinyl Acetate and Polyvinyl Alcohol and Treatment With Acetic Acid or Hypophosphorous Acid and Peroxide The following procedure was used to synthesize low molecular weight polyvinyl acetate: In a two-liter jacketed reactor equipped with mechanical stirrer, condenser and connected to a metric pump, a solution containing 646 g of methanol and 545 g vinyl acetate was heated to reflux under stirring. A solution of 10.7 g of Trigonox EHP (bis(2-ethylhexyl)peroxy dicarbonate, supplied by AKZO Chemicals) in 20 g methyl alcohol was injected into the monomer solution. A mixture of 639 g of vinyl acetate and 11.8 g of acetaldehyde was added through a metric pump in 90 minutes, resulting in 87–90% conversion of the vinyl acetate to polyvinyl acetate. Unreacted monomer was removed by azeotrope distillation through a Dean-Stark condenser; the vinyl acetate/methanol forming a 70/30 azeotrope in the vapor phase. The liquid level was kept constant by pumping in fresh methyl alcohol. The solution of polyvinyl acetate was ready for saponification when the residual monomer was determined to be less than 250 ppm by potassium bromide/bromate titration. Polyvinyl acetate was analyzed by size exclusion chromatography and had a number average molecular weight of 16,740 daltons which was equivalent to a degree of polymerization of 195.

Polyvinyl Alcohol, Sample A

To 500 g of a 50% solution of the above prepared polyvinyl acetate was mixed 32.5 g of methanolic 10% sodium hydroxide. The mixture was then poured into a plastic bag and the bag put into a water bath at 40° C. for ten minutes. A polyvinyl alcohol gel was formed. The gel was ground into small particles in a Wiley mill, washed with 400 ml methyl alcohol at room temperature and filtered.

Polyvinyl Alcohol, Sample B

A polyvinyl alcohol gel was prepared as in Sample A. The particles were however washed with 400 ml of methanol containing 5.0 g of acetic acid (mol equivalent of sodium hydroxide in saponification) and filtered.

Polyvinyl Alcohol, Sample C

A polyvinyl alcohol gel was prepared as in Sample A. The particles were washed with 400 ml of methanol containing 7.5 g of a 50% aqueous solution of hypophosphorous acid (0.7 mol equivalent of the base catalyst in saponification) and 0.3 g of 70% tert-butylhydroperoxide. The slurry was warmed to 50–55° C. for one hour and filtered.

Polyvinyl alcohol samples A, B and C had a hydrolysis of 97.2–97.8%. They were dried first at 30° C. for 15 hours after which the APHA number of a 4% aqueous solution of the polyvinyl alcohol powder, against DI water as a control, was determined using a Hunter Lab ColorQuest 1200-ENS calorimeter. The same samples were put back in the oven and heated at 150° C. for 90 minutes and the yellowing measured again. The results (Table 1) showed that sample C, which was neutralized with a mixture of hypophosphorous acid and an organic peroxide, possessed excellent low yellow color after drying at 30° C. and maintained its low color after heating to 150° C. These data show that the polyvinyl alcohol treated with hypophosphorous acid and tert-butylhydroperoxide are significantly more thermally stable than untreated polyvinyl alcohol or polyvinyl alcohol treated with acetic acid.

TABLE 1

POLYVINYL ALCOHOL
(Dp = 195)

APHA number (4% aqueous solution)

| Drying conditions and pH | Sample A Control | Sample B Acetic Acid | Sample C Hypophosphorous acid and tert-butylhydroperoxide |
|---|---|---|---|
| 30° C./15 hours | 203.4 | 83.4 | 29.9 |
| 150° C./90 min | dark brown | 428.2 | 34.7 |
| pH | 7.2 | 5.5 | 4.1 |

EXAMPLE 2

Reversing the Color of Polyvinyl Alcohol Using Hypophosphorous Acid and Hydrogen Peroxide Dried polyvinyl alcohol (A) (100 g) from example 1, having an APHA value of 203.4, was sprayed under stirring with 100 ml methanol containing 3 g of 50% hypophosphorous acid and 0.3 g of 35% hydrogen peroxide. The swollen polyvinyl alcohol was heated to 50–55 degree centigrade for two hours. After drying the polyvinyl alcohol at 30° C. for 15 hours and at 150° C. for 90 minutes, the APHA numbers of a 4% aqueous solution dropped significantly (see Table 2.) The treated polyvinyl alcohol had a significantly lower APHA number (29.9) than the original polyvinyl alcohol APHA value of 203.4 and remained low (34.7) even at 150° C. This example showed that the discoloration in polyvinyl alcohol could be reversed by treatment of the polyvinyl alcohol powder with a hypophosphorous acid/peroxide combination. It also showed that the thermal stability of the polyvinyl alcohol could be maintained at temperatures up to 150° C. by using a small amount of hypophosphorous acid and hydrogen peroxide in the formulation.

TABLE 2

POLYVINYL ALCOHOL
(Dp = 195)

APHA (4% aqueous solution)

| Drying Conditions | Control | Hypophosphorous Acid and Hydrogen Peroxide |
|---|---|---|
| Prior to treating with hypophosphorous acid and hydrogen peroxide. | 203.4 | |
| 30° C./15 hours | | 32.4 |
| 150° C./90 minutes | | 37.5 |

EXAMPLE 3

Effect of Sodium Hypophosphite Alone or With Tert-butylhydroperoxide After Saponification A 50% solution of the polyvinyl acetate from example 1 (500 g) was mixed with 19.7 g of methanolic 10% sodium hydroxide and poured into a plastic bag. The bag was then put into a water bath at 40° C. for 10 minutes. A polyvinyl alcohol gel was formed which was ground into small particles in a Wiley mill, washed immediately with 500 ml methyl alcohol containing 3 g acetic acid, and filtered to yield a polyvinyl alcohol with a hydrolysis of 85.7%. In one experiment (Sample A), about 1 g of sodium hypophosphite dissolved in 20 g of methanol was mixed mechanically at 50 degree centigrade with 100 g of the neutralized, wet polyvinyl alcohol obtained from the saponification above, for 20 minutes and excessive solvent was removed by filtration. In another experiment (Sample B), 100 g wet polyvinyl alcohol was mixed for 20 minutes at 50° C. with a solution composed of 1 g sodium hypophosphite and 0.2 g 70% tert-butylhydroperoxide in 20 g methanol. Excessive solvent was removed by filtration. Drying at 50° C. for six hours in an oven indicated that there was considerably less discoloration in polyvinyl alcohol samples treated with either sodium hypophosphite or a sodium hypophosphite/peroxide combination. See Table 3 for specific AHPA values.

TABLE 3

POLYVINYL ALCOHOL
(Dp = 195)

APHA (4% aqueous solution)

| Heating and pH | Untreated Control | Sample A Sodium hypophosphite | Sample B Sodium hypophosphite/ tert-butyl hydroperoxide |
|---|---|---|---|
| 50° C./6 hours | 93.2 | 44.9 | 31.8 |
| pH | 4.56 | 4.59 | 4.61 |

EXAMPLE 4

Adding Hypophosphorous Acid and Peroxide After Saponification

A low molecular weight polyvinyl acetate was synthesized at high temperature (80° C.) in a pressure reactor using Trigonox EHP (bis(2-ethylhexyl)peroxy dicarbonate)). The molecular weight of polyvinyl acetate, as determine by size exclusion chromatography, was 9,900 daltons, which was equivalent to a degree of polymerization of 115. The saponification procedure of Example 3 was followed, to produce a polyvinyl alcohol having 86.4% hydrolysis. In Sample A, 100 g of the wet polyvinyl alcohol was mixed with 20 g of methanol containing 1.5 g acetic acid. In Sample B, 100 g of the wet polyvinyl alcohol was mixed with 20 g of methanol containing 1.5 g of acetic acid plus 0.3 g of 35% hydrogen peroxide. In Sample C, 100 g of wet polyvinyl alcohol was mixed with 3.0 g of 50% aqueous hypophosphorous acid and 0.3 g of 35% hydrogen peroxide and kept at 55° C. for one hour. The three samples were heated in a vacuum oven first at 70° C. for 6 hours, then at 150° C. for 90 minutes and finally for 150 minutes at 150° C. Sample C became only yellowish at the end of the heating while samples A and B were getting brownish. The APHA values for the three samples are presented in Table 4.

TABLE 4

POLYVINYL ALCOHOL (Dp = 115)

APHA (4% aqueous solution)

| Heating Conditions | Sample A Acetic acid | Sample B Acetic acid/ hydrogen peroxide | Sample C Hypophosphorous acid/hydrogen peroxide |
|---|---|---|---|
| 70° C./6 hours | 43.3 | 31.2 | 9.6 |
| 150° C./90 minutes | 273.4 | 256.4 | 27.5 |
| 150° C./150 minutes | 533.6 | 542.4 | 32.9 |

EXAMPLE 5

Treatment Before Saponification With Hypophosphorous Acid and Tert-butylhydroperoxide In Sample B, solutions of 3 g of 50% aqueous hypophosphorous acid and 0.3 g of a 70% aqueous solution of tert-butylhydroperoxide were added to 600 g of a solution of 42.5% polyvinyl acetate in methyl alcohol having a degree of polymerization of 115 (same polyvinyl acetate solution as in example 4). The solution was heated at 60° C. for 1 hour. Saponification was carried out with enough alkaline catalyst to achieve a hydrolysis of 85.7%. The APHA yellowing index was measured for each sample. Data for APHA values are summarized in Table 5. These data show that the protective effect of the hypophosphorous acid/tert-butylhydroperoxide is not as pronounced as the hypophosphorous acid/hydrogen peroxide. However the APHA value is still considerably lower than the APHA number of the control.

TABLE 5

POLYVINYL ALCOHOL (Dp = 115)

APHA (4% aqueous solution)

| Heating Conditions | Sample A Untreated Control | Sample B Hypophosphorous Acid and Tert-butylhydroperoxide |
|---|---|---|
| 70° C./6 hours | 43.3 | 26.7 |
| 150° C./90 minutes | 273.4 | 118.6 |

EXAMPLE 6

Treatment of Polyvinyl Alcohol After Saponification

A 600 g sample of a 50% methanol solution of polyvinyl acetate, having a degree of polymerization of 310, was saponified by mixing 34.9 g of 10% methanolic sodium hydroxide. The saponification was carried out, as described previously, in a water bath at 40° C. for 10 minutes. The resulting polyvinyl alcohol gel was ground, washed with 600 g of methanol and filtered. About 100 g of wet polyvinyl alcohol granulates was acidified by making a slurry with 1.2 g acetic acid in 60 g methanol (Sample B). About 100 g wet polyvinyl alcohol was slurried with 60 g methanol containing 1 g phosphorous acid and 0.3 g of 35% hydrogen peroxide at 50 degree for 1 hour (Sample C). As reference, 100 g of wet polyvinyl alcohol was simply slurried in 60 g methanol (Sample A). After filtration polyvinyl alcohol samples were dried at 80 degrees centigrade for 15 hours. APHA values were measured on a 4% aqueous solution of the polyvinyl alcohol and are presented in Table 6. The results show that samples subjected to treatment with phosphorus acid and peroxide remained substantially colorless when heated for a long period of time (Sample C), compared to Samples A (control) and B (acetic acid) in which the yellowing is significantly higher.

TABLE 6

POLYVINYL ALCOHOL (Dp = 310)

| Drying Conditions | A Control | B Acetic Acid | C Phosphorous Acid and Hydrogen peroxide |
|---|---|---|---|
| APHA (80° C./15 hours) | 97.7 | 25.7 | 8.8 |
| % Hydrolysis | 99.0 | 98.9 | 98.6 |

EXAMPLE 7

Comparison of Various Additives on Color Formation in Polyvinyl Alcohol at High Temperatures Four hundred grams of a 50% solution of polyvinyl acetate, having a degree of polymerization of 310, was saponified by mixing 23.3 g of 10% methanolic sodium hydroxide in the same manner as in Example 6. After grinding, the wet polyvinyl alcohol particles were slurried in 400 grams of a water/methyl acetate/methanol (3/27/70) solvent mixture containing 2.3 g of hypophosphorous acid at 50° C., for 40 minutes. The polyvinyl alcohol was then filtered and the wet polyvinyl alcohol was dried in a nitrogen purged convection oven at 125° C. for 180 minutes. APHA color was measured on a 4% aqueous solution at 0, 45, 90 and 180 minutes. The same experiment was repeated by adding each of the following compounds in place of the hypophosphorous acid: 3.5 g of acetic acid; 2.9 g phosphorous acid; and 3.4 g of phosphoric acid. The amount of acids is equal to 0.6 mole equivalent to the base catalyst, except for acetic acid, which was 1 mole equivalent. The data show that hypophosphorous acid and, to a lesser degree, phosphorous acid are effective in obtaining a substantially low color polyvinyl alcohol without the addition of peroxide. In comparison, acetic acid and phosphoric acid, showed a significantly higher increase in color after 90 to 180 minutes at 125° C.

TABLE 7

| Additive | APHA Number of 4% aqueous POLYVINYL ALCOHOL (Dp = 310) | | | |
|---|---|---|---|---|
| | 0 min. | 45 min. | 90 min. | 180 min. |
| None (reference) | 16.3 | 49.5 | 131.4 | 143.3 |
| Acetic Acid | 13.4 | 20.9 | 41.4 | 49.6 |
| Hypophosphorous acid | 8.5 | 7.4 | 8.3 | 8.3 |
| Phosphorous acid | 10.8 | 18.1 | 36.5 | 38.8 |
| Phosphoric acid | 10.2 | 20.4 | 57.2 | 58.5 |

What is claimed is:

1. In the preparation of polyvinyl alcohol by the saponification of polyvinyl acetate, the improvement comprising, producing a thermally stable substantially low yellow color polyvinyl alcohol by:

mixing an alcoholic solution of polyvinyl acetate with an alcoholic solution of 0.5 to 10% by weight of a reducing phosphorus-containing compound and 0 to 5% by weight of a peroxide, based on the weight of polyvinyl acetate;

heating the mixture of polyvinyl acetate, phosphorus-containing compound, and peroxide to 40 to 70° C. for 0.5 to 3 hours; and transferring the mixture to a saponification process.

2. The process of claim 1 wherein the alcoholic solution of the reducing phosphorus-containing compound and peroxide comprises 1 to 3% by weight of reducing phosphorus-containing compound and 0.3 to 1% by weight of peroxide, and the mixture is heated to 50 to 60° C. for 1 to 2 hours.

3. The process of claim 2, wherein the reducing phosphorus-containing compound is selected from the group consisting of hypophosphorous acid, phosphorous acid, sodium salt of hypophosphorous acid, ammonium salt of hypophosphorous acid, sodium salt of phosphorous acid, and an ammonium salt of phosphorous acid, and the peroxide is selected from the group consisting of hydrogen peroxide, tert-butylhydroperoxide and cumyl hydroperoxide.

4. The process of claim 3, wherein the reducing phosphorus-containing compound is hypophosphorous acid and the peroxide is hydrogen peroxide.

5. The process of claim 1, wherein the degree of polymerization of the polyvinyl acetate is 100 to 250.

6. The process of claim 5, wherein, after heating to temperatures above about 125° C. for at least one hour, a 4% aqueous solution of the low yellow color polyvinyl alcohol has a APHA number of less than about 60.

7. The process of claim 5, wherein, after heating to temperatures above about 125° C. for at least one hour, a 4% aqueous solution of the low yellow color polyvinyl alcohol has an APHA number of less than about 30.

8. The process of claim 1, wherein the degree of polymerization of the polyvinyl acetate is 250 to 350.

9. The process of claim 8, wherein, after heating to temperatures above about 125° C. for at least one hour, a 4% aqueous solution of the low yellow color polyvinyl alcohol has an APHA number of less than about 30.

10. The process of claim 8, wherein, after heating to temperatures above about 125° C. for at least one hour, a 4% aqueous solution of the low yellow color polyvinyl alcohol has an APHA number of less than about 10.

11. A process for reversing the color of polyvinyl alcohol and for producing a substantially low yellow color and thermally stable polyvinyl alcohol comprising dispersing a polyvinyl alcohol gel or polyvinyl alcohol particles with an alcoholic solution comprising 0.5 to 10% by weight of a reducing phosphorus-containing compound and 0 to 5% by weight of a peroxide, based on the weight of polyvinyl alcohol, to form swollen particles or a slurry of particles;

allowing the swollen particles or slurry of particles to stand for about 0.5 to 3 hours; and drying the swollen particles or the slurry of particles.

12. The process of claim 11 wherein the alcoholic solution of reducing phosphorus-containing compound and peroxide comprises 1 to 3% by weight of reducing phosphorus-containing compound and 0.3 to 1% by weight of peroxide, and the slurry or swollen particles are heated from 50 to 60° C.

13. The process of claim 12, wherein the reducing phosphorus-containing compound is selected from the group consisting of hypophosphorous acid, phosphorous acid, sodium salt of hypophosphorous acid, ammonium salt of hypophosphorous acid, sodium salt of phosphorous acid, an ammonium salt of phosphorous acid, and the peroxide is selected from the group consisting of hydrogen peroxide, tert-butylhydroperoxide and cumyl hydroperoxide.

14. The process of claim 13, wherein the reducing phosphorus-containing compound is hypophosphorous acid and the peroxide is hydrogen peroxide.

15. The process of claim 11, wherein the degree of polymerization of the polyvinyl alcohol is 100 to 250.

16. The process of claim 15, wherein, after heating to temperatures above about 125° C. for at least one hour, a 4% aqueous solution of the low yellow color polyvinyl alcohol has a APHA number of less than about 60.

17. The process of claim 15, wherein, after heating to temperatures above about 125° C. for at least one hour, a 4% aqueous solution of the low yellow color polyvinyl alcohol has an APHA number of less than about 30.

18. The process of claim 11, wherein the degree of polymerization of the polyvinyl alcohol is 250 to 350.

19. The process of claim 18, wherein, after heating to temperatures above about 125° C. for at least one hour, a 4% aqueous solution of the low yellow color polyvinyl alcohol has an APHA number of less than about 30.

20. The process of claim 18, wherein, after heating to temperatures above about 125° C. for at least one hour, a 4% aqueous solution of the low yellow color polyvinyl alcohol has an APHA number of less than about 10.

* * * * *